Dec. 16, 1952 E. L. POTTS 2,621,675
DIFFERENTIAL PRESSURE OPERATED VALVE MECHANISM
Filed March 12, 1949
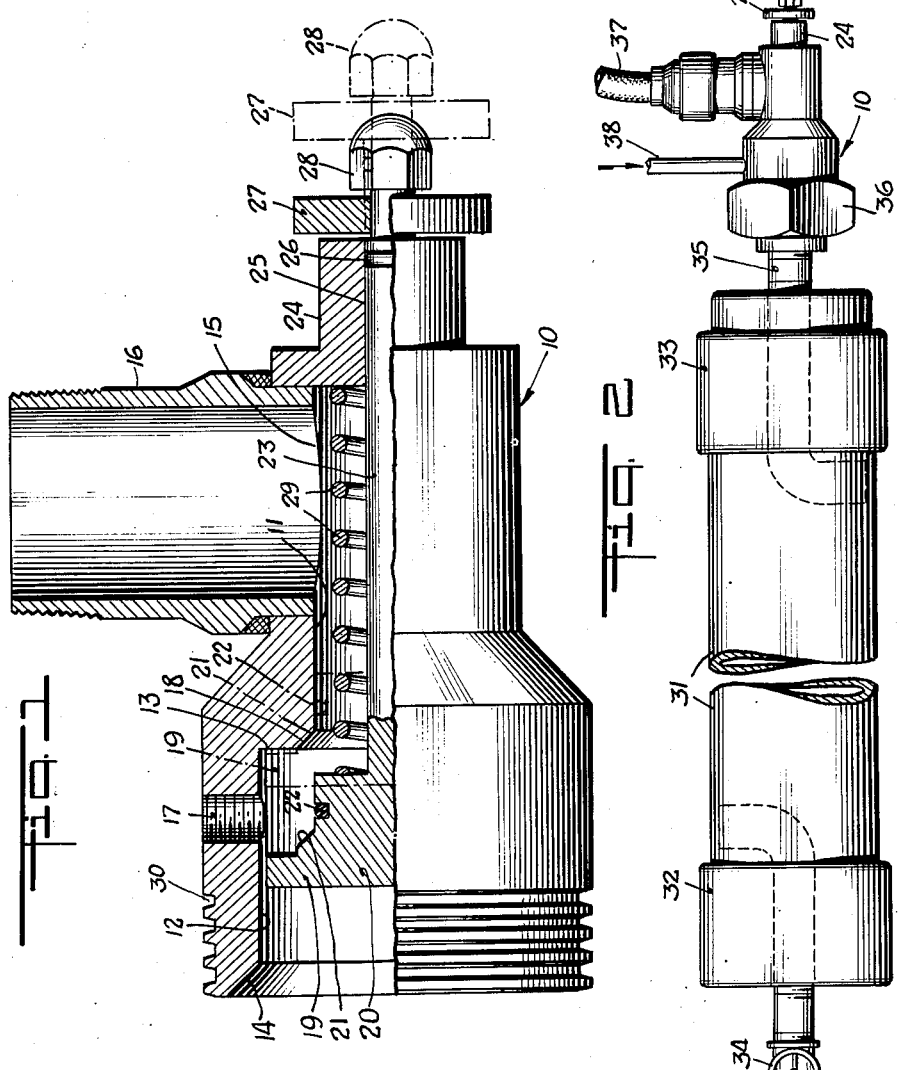
INVENTOR.
*E. L. Potts*
BY
ATTORNEY Patented Dec. 16, 1952

2,621,675

UNITED STATES PATENT OFFICE 2,621,675

DIFFERENTIAL PRESSURE OPERATED VALVE MECHANISM

Ernest L. Potts, Houston, Tex., assignor, by mesne assignments, to Cicero C. Brown, Houston, Tex.

Application March 12, 1949, Serial No. 81,133

2 Claims. (Cl. 137—505)

This invention relates to a valve mechanism and more particularly to a valve mechanism adapted to automatically regulate the passage of two streams of fluid at different pressures to and from a closed vessel.

This application is a continuation-in-part of United States patent application Serial No. 79,486, filed March 3, 1949, jointly by the present inventor and Floyd L. Scott, Jr., in which there was disclosed a method and apparatus for fluid pressure testing of vessels such as pipe and the like. The apparatus and method disclosed included a novel form of automatic valve for controlling the transfer of pressure fluid to and from such vessels, the fluid passing through the valve being conducted in the form of separate high and low pressure streams. The present invention is directed to the details of the automatic valve, per se, as it is a structure of wider application than the particular one described in the aforementioned application.

A principal object of the present invention is to provide a valve mechanism for controlling the passage of separate high and low pressure streams of fluid between a source, or sources, and a closed vessel in accordance with predetermined pressure differentials in the flow passages of the valve mechanism.

Another object is to provide a valve mechanism having separate relatively low and high pressure inlets and a single outlet and having a closure member between the low pressure fluid inlet and the outlet, said closure member being operable by differential pressures between said inlet and outlet to control the passage of fluid therebetween.

A more specific object is to provide a valve mechanism including a generally tubular casing having a low pressure fluid inlet and an outlet connected by a flow passage and having a valve interposed in said passage biased to the open position by a spring means of predetermined strength and operable by predetermined increase in pressure on the down-stream side thereof to close said passage and having a relatively high pressure fluid inlet communicating with said passage on the down-stream side of said valve.

Other and more specific objects and advantages of this invention will become apparent from the following detailed description when read in conjunction with the accompanying drawings which illustrate a useful embodiment in accordance with this invention.

Fig. 1 is a longitudinal quarter-sectional view of a valve mechanism in accordance with one embodiment of this invention, showing the closure member in normally open position in solid lines and in the closed position in broken lines;

Fig. 2 illustrates the valve mechanism connected into an apparatus arrangement such as may be employed for pressure testing pipe.

Referring to the drawings and Fig. 1 particularly, the valve mechanism comprises a generally tubular casing, designated generally by the numeral 10, having its bore divided into an inlet chamber 11 and an outlet chamber 12, outlet chamber 12 being of somewhat larger diameter than inlet chamber 11, forming a shoulder 13 between the sections. The bore of chamber 12 is open at its outer end forming an outlet port 14 for the casing. An inlet port 15 communicates with the bore of chamber 11 through the side of the casing and has a connection 16 connected thereto for the passage of fluid into the casing. A fluid inlet port 17 extends radially through the wall of casing 10 into communication with chamber 12 at a point between outlet port 14 and shoulder 13. Inlet port 15 is preferably of relatively greater area than port 17. The inner edge of shoulder 13 is upwardly and inwardly tapered to form an annular valve seat 18. A disk-shaped closure member 19 is arranged transversely of chamber 12 and is dimensioned for free axial reciprocation therein. The face of disk 19 facing the bore of chamber 11 is provided with a cylindrical boss 20 which is dimensioned to a sliding fit in the bore of chamber 11. An annular seating surface 21 surrounds boss 20 at its juncture with disk 19 and is tapered to complement seat 18. A packing ring 22 is seated in the periphery of boss 20 to provide a fluid-tight sliding seal between boss 20 and the bore of chamber 11 when boss 20 is inserted therein. A stem 23 extends from the inner end of boss 20 through the outer end of chamber 11 and passes through a tubular cap 24 which forms a closure for the outer end of chamber 11, stem 23 passing through the bore 25 of cap 24 and being provided with a sealing ring 26 to provide a fluid-tight sliding seal between stem 23 and cap 24. The outer end of stem 23 has a washer 27 keyed thereto and held in place thereon by a screw cap 28. Washer 27 serves as an abutment or stop to limit the inward movement of stem 23. A coil spring 29 surrounds stem 23 and is held in compression between cap 24 and the inner end of boss 20. Coil spring 29 is selected of a suitable strength to normally urge closure disk 19 to the open position, as shown in solid lines in Fig. 1, under a suitable predetermined pressure. The discharge end of casing 10 is provided with any suitable connection means, such as external threads 30, for connecting the casing to a vessel to and from which fluid is to be transferred under the control of the described valve mechanism.

Fig. 2 shows the above-described valve mechanism connected to a pipe which is to be pressure tested by means of a hydraulic fluid supplied thereto under the control of the valve mechanism.

The pipe 31 is provided with fluid-tight end closures 32 and 33 for its left and right hand ends, respectively. Closure 32 is provided with a bleed-valve 34 and closure 33 is provided with a threaded connection 35 to which the herein-described valve mechanism is connected by means of a union 36. A conduit 37 is connected to inlet connection 16 and a tube 38 is connected to inlet port 17 in any suitable manner. Conduit 37 is designed to convey a relatively large volume stream of the testing fluid, such as water, at relatively low pressure into casing 10, and may be the discharge of a conventional low pressure, high volume pump (not shown). Tube 38 is designed to convey to casing 10 a relatively low volume stream of the same fluid at substantially higher pressure than the fluid in conduit 37 and may be the discharge of a high pressure pump (not shown).

The operation of the apparatus in pressure testing pipe is as follows:

Pipe 31 will be empty at the start of operations and closure disk 19 will be in the open position shown in full lines in Fig. 1, under the expansive pressure of coil spring 29. Low pressure fluid will be pumped through conduit 37, into and through chamber 11 and will flow through chamber 12 and connection 35 into the interior of pipe 31. This relatively large volume stream of fluid will be employed to effect rapid filling of the pipe preparatory to applying the high test pressure to the pipe. A stream of fluid at the desired high test pressure will be introduced at the same time through conduit 38 and inlet port 17 into chamber 12. As this stream will normally be of relatively low volume, it will have relatively little effect on the rate of filling of the pipe or on the pressure therein until the pipe has become substantially filled with the fluid. The stream of high pressure fluid will merely merge with the larger low pressure stream entering the pipe. Bleed valve 34 will be kept open to vent any air trapped in the pipe by the entering fluid and will be closed immediately upon the appearance of fluid which will indicate that the pipe has become filled. When this occurs, the pressure of the fluid entering through inlet port 17 will become effective, because of the relative incompressibility of the liquid, to produce a very rapid increase in pressure within the pipe. This increased pressure will produce a back pressure on the down-stream side of closure disk 19 and a resulting pressure differential across seat 18 between chambers 12 and 11 in a direction tending to move the closure disk to the closed position shown in broken lines in Fig. 1, which will be attained as soon as the pressure differential exceeds the strength of coil spring 29. Due to the incompressibility of the hydraulic fluid, it will be obvious that increase in pressure on the down-stream side of the closure will occur very quickly, thereby quickly closing the valve and shutting off the flow of fluid through inlet port 15. At the same time a fluid-tight seal is formed by the valve closure which will prevent escape of any high pressure fluid entering through inlet port 17 with the result that the latter fluid will be able to quickly raise the pressure within pipe 31 to the desired test pressure. When the latter is attained, vent valve 34 is opened to relieve the pressure in pipe 31 whereupon the back-pressure upon closure disk 19 will be relieved and the valve will open under the urging of coil spring 29. Suction will then be applied to conduit 37 and the fluid in pipe 31 may be quickly withdrawn therefrom. The supply of high pressure fluid through inlet 17 may be cut off at this time, if desired, or may be allowed to continue flowing, in which case fluid entering therethrough will be withdrawn with the main stream being removed through inlet port 15.

By the employment of the described valve mechanism, it will be evident that the operations for testing pipe with hydraulic pressure fluid may be greatly speeded up. It will be evident that the described valve mechanism may be employed in other applications where similar sequences of operations for conveying pressure fluids to and from a closed vessel are desired.

It will be understood that various changes and modifications may be made in the details of the illustrative embodiment without departing from the scope of the appended claims but within the spirit of this invention.

What I claim and desire to secure by Letters Patent is:

1. A valve mechanism, comprising, a tubular casing having an outlet chamber at one end thereof, and an inlet chamber at the other end thereof, an axial passageway connecting said chambers, an annular valve seat in said passageway, a closure disk disposed on the downstream side of said seat and movable relative thereto to open and close said passageway, a tubular boss on the inlet side of said valve disk adapted to enter the bore of said inlet chamber when said disk is on said seat, an annular sealing element arranged between said boss and the adjacent wall of said inlet chamber, cap means closing the outer end of said inlet chamber, a valve stem extending axially from said closure disk through said inlet chamber and slidable through said cap means, a coil spring of predetermined strength surrounding said stem and mounted in compression between said cap and disk to urge the latter away from said seat, an outlet port from said outlet chamber, and separate inlet ports communicating with the respective chambers on opposite sides of said seat.

2. A valve mechanism, comprising, a tubular casing having an outlet chamber at one end thereof and an inlet chamber at the other end thereof, an axial passageway connecting said chambers, an annular valve seat in said passageway, a closure disk disposed on the downstream side of said seat and movable relative thereto to open and close said passageway, a cap means closing the outer end of said inlet passageway, a valve stem extending axially from said closure disk through said inlet chamber and slidable through said cap, an annular seal between said stem and the wall of said inlet chamber adjacent said cap means, a coil spring of predetermined strength surrounding said stem and mounted in compression between said cap means and disk to urge the latter away from said seat, an outlet port from said outlet chamber, and separate inlet ports communicating with the respective chambers on opposite sides of said seat.

ERNEST L. POTTS.

REFERENCES CITED

The following references are of record in the file of this patent:

UNITED STATES PATENTS

| Number | Name | Date |
|---|---|---|
| 415,750 | Vaile | Nov. 26, 1889 |
| 545,714 | McGrath | Sept. 3, 1895 |
| 650,064 | Kitson | May 22, 1900 |
| 821,859 | Clegg | May 29, 1906 |
| 1,333,660 | Hutchins | Mar. 16, 1920 |
| 2,154,477 | Sinclair | Apr. 18, 1939 |